United States Patent [19]

Arpin

[11] Patent Number: 5,211,104
[45] Date of Patent: May 18, 1993

[54] COFFEE FLOW CONCENTRATOR FOR COFFEEMAKER

[76] Inventor: John B. Arpin, 3251 N. Andrews Ave., Fort Lauderdale, Fla. 33309

[21] Appl. No.: 957,373

[22] Filed: Oct. 7, 1992

[51] Int. Cl.⁵ .............................................. A47J 31/06
[52] U.S. Cl. ........................................ 99/295; 99/306; 210/474; 210/479
[58] Field of Search .................. 99/279, 295, 306, 316, 99/317, 322, 323; 210/477, 479, 474, 469, 473, 478, 481, 482, 480

[56] References Cited

U.S. PATENT DOCUMENTS

| 4,176,588 | 12/1979 | Baron | 99/323 |
|---|---|---|---|
| 4,656,932 | 4/1987 | Kopp | 99/296 |
| 4,728,425 | 3/1988 | Sandvig | 210/477 |
| 4,735,719 | 4/1988 | Benedict | 210/474 |
| 4,963,262 | 10/1990 | Johnstone | 210/477 |
| 5,132,124 | 7/1992 | Tamaki et al. | 99/295 |

FOREIGN PATENT DOCUMENTS 0022396 of 1903 United Kingdom .................. 99/317
0285175 2/1928 United Kingdom .................. 99/322

Primary Examiner—Harvey C. Hornsby
Assistant Examiner—Reginald L. Alexander
Attorney, Agent, or Firm—Alvin S. Blum

[57] ABSTRACT

An apparatus for use with a coffee maker holds the grounds in a cylindrical configuration in the hot water stream for more uniform and efficient extraction. A thin-wall, right cylinder has a slotted lower edge. A thin-wall frustum of a cone also has a smaller diameter, slotted lower edge. Both lower edges are resilient and cooperate with one another to hold the central portion of a filter elastically therebetween. The peripheral portion of the filter is held securely in the annular space between cylinder and frustum. The slots in the cylinder also provide for lateral liquid flow through the grounds as the volume of liquid in the cylinder increases. The frustum may be configured to facilitate use of a flat filter.

6 Claims, 1 Drawing Sheet

U.S. Patent　　　　　May 18, 1993　　　　　5,211,104
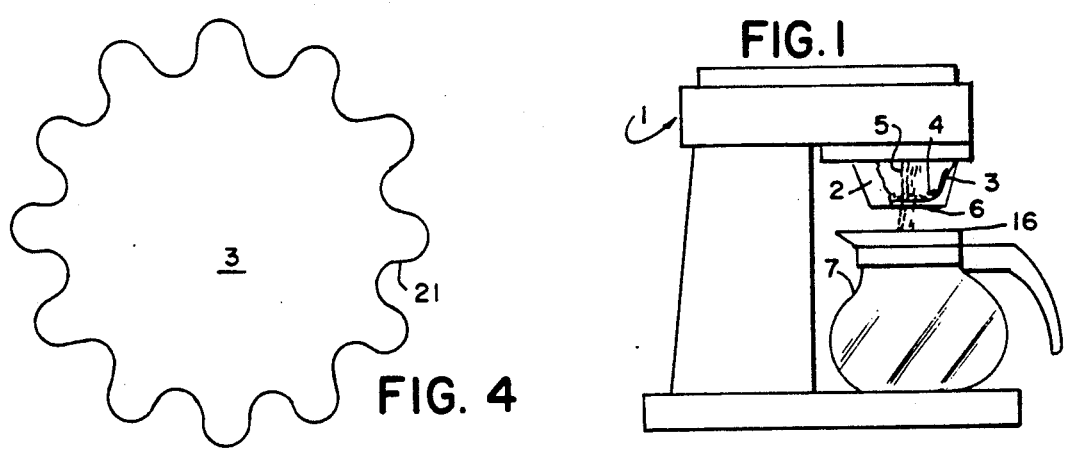
FIG. 1
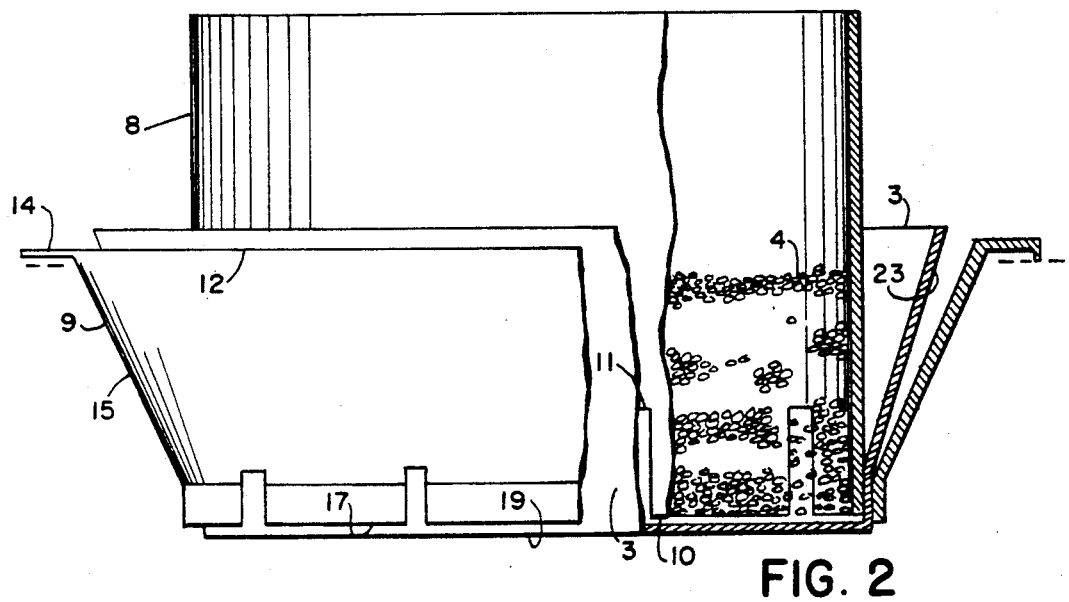
FIG. 4
FIG. 2
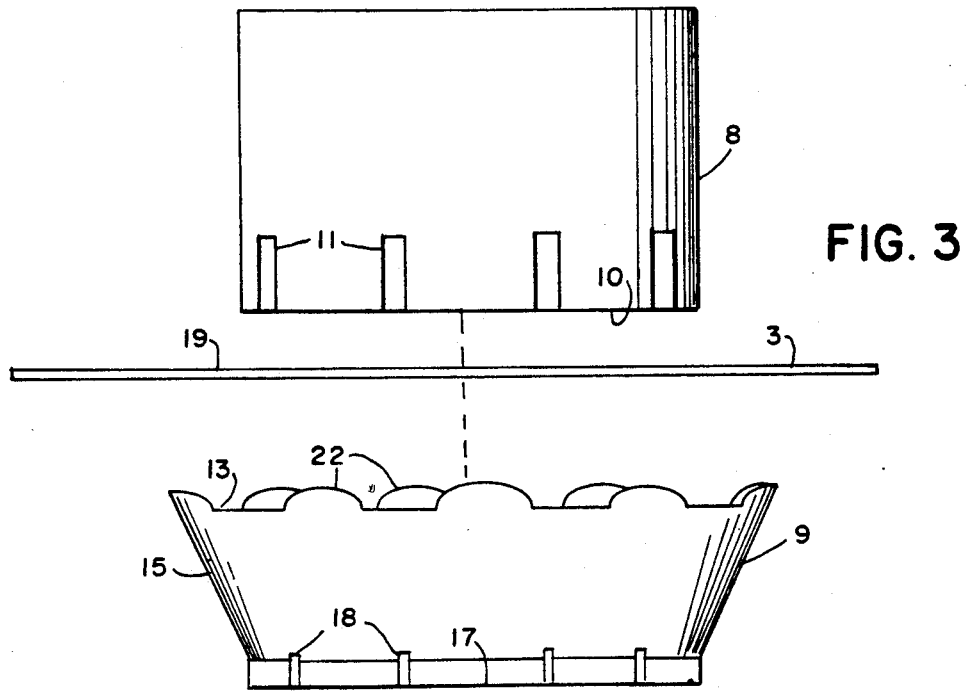
FIG. 3

COFFEE FLOW CONCENTRATOR FOR COFFEEMAKER

FIELD OF THE INVENTION

This invention relates to automatic coffeemakers and more particularly to structures holding the coffee in the hot water stream for more efficient extraction.

BACKGROUND OF THE INVENTION

Automatic coffeemakers have a water reservoir and means for moving water from the reservoir and heating the water so that a small steady stream of water at correct extraction temperature is poured from above through the neck of a carafe or pot which holds the finished brew at an appropriate temperature.

Held interposed in that falling stream of hot water is a porous filter holding the ground coffee. The filter is held suspended by a filter holder, which generally holds the perimeter of the filter. The filter generally has a flat bottom and a fluted, upturned, and outwardly sloping fluted periphery. When poured into the filter, the ground coffee forms a thin layer along the flat bottom of the filter. As the narrow stream of hot water strikes the thin layer of ground coffee, it hits the center of the layer and passes through, thoroughly extracting the center portion. It may extract so thoroughly that it extracts bitter elements. Depending on the flow rate, thickness of the layer of ground coffee, and permeability of the filter, some of the hot water will flow laterally and extract the grounds that are around the center, but always at a lesser rate than at the center. Since the area of an annulus of a disc increases as the square of the distance from the center, it is apparent that much of the ground coffee on the filter will be unextracted, which is wasteful of an expensive commodity. In the prior art, distributors have been provided to break up the single water stream into multiple streams for more efficient extraction.

SUMMARY OF THE INVENTION

It is accordingly an object of the invention to provide a simple, inexpensive device to hold ground coffee in place in a coffeemaker apparatus that will ensure more uniform and efficient extraction of the ground coffee. The device of the invention comprises a thin-walled right cylinder having a slotted lower edge and a thin-walled frustum of a cone having a slotted lower, smaller diameter edge. The cylinder fits into the frustum, trapping and holding firmly a filter therebetween. The slotted edges provide resilience to the edges so that they fit snugly together to hold the filter firmly. The broad taper of the frustum and a flange on its upper edge permit it to be held in position by the holders of most conventional coffeemakers or to rest upon the neck of the brewed coffee container or carafe. The cylinder is adapted to hold the ground coffee in a concentrated column on the filter so that all of it will be in the liquid stream for more uniform and efficient extraction. The slots in its lower edge permit lateral flow of liquid into the frustum when the level of liquid in the cylinder is high.

These and other objects, advantages and features of the invention will become more apparent when the detailed description is considered in conjunction with the drawings in which:

BRIEF DESCRIPTION OF THE DRAWINGS

FIG. 1 is a front elevation view partially broken away, of a coffeemaker assembly of the prior art.

FIG. 2 is a front elevation view, partially broken away, of an assembled device of the invention.

FIG. 3 is a front elevation, disassembled view of another device of the invention.

FIG. 4 is a plan view of another filter for holding the ground coffee.

DETAILED DESCRIPTION OF PREFERRED EMBODIMENTS

Referring now first to FIG. 1, a coffeemaker apparatus 1 of the prior art is shown with a conventional holder 2 for holding a filter 3, on which is deposited ground coffee 4 for extraction by hot water which is heated and forced through the ground coffee in a narrow vertical stream 5. The brewed coffee passed through the filter, through holes 6 in holder 2, and into the receptacle 7. If the filter is not correctly placed, or the flow rate is excessive, the filter may collapse inwardly and some of the solids may flow over the top of the filter, finding their way into the receptacle. Furthermore, the stream extracts the centrally positioned solids more than the peripherally positioned solids resulting in a bitter brew and inefficient extraction.

Referring now to FIGS. 2 and 3, the coffee concentrator and filter retainer of the invention comprises a right cylinder 8 and a frustum of a cone 9. Both of these members are formed of a thin wall heat resistant plastic or metal. The bottom edge 10 of the cylinder 8 is provided with slots 11 to provide a castellated edge with resilience. The frustum 9 has a large diameter upper edge that may be a smooth edge 12 as in FIG. 2 or a scalloped upper edge 13 as in FIG. 3. The frustum may also be provided with a flange 14 as in FIG. 2 as needed for support in certain coffeemakers. Alternatively, the sloping outer walls 15 of the frustum may directly engage the neck 16 of the brewed coffee receptacle 7. The smaller diameter, lower edge 17 of the frustum is also provided with vertical slots 18 to give it a castellated, resilient edge. The castellated resilient edges 10, 17 can elastically change their diameters when forced together to elastically trap the filter 3 therebetween to ensure that the central portion 19 of the filter will be held flat and fixed at the bottom of the cylinder with the periphery 23 of the filter extending upward between cylinder and frustum to prevent the filter edge from collapsing inward. The cylinder 8 holds in ground coffee 4 in a more concentrated, uniform cylindrical configuration so that the falling stream of hot water meets the entire charge of grounds more uniformly. The slots 10 in the cylinder serve a second purpose. As the volume of liquid held in the cylinder increases, more of the liquid moves laterally through the charge and out through the slots for more uniform extraction.

Applicant has found that this structure, which provides for a thicker column of ground coffee for extraction, is so much more efficient that the amount of coffee required to produce the same final strength of brew is reduced by 40%. The final product is also less bitter because there is no overextracted central portion.

Filters for use in the invention may be the type well known in the art with a flat central portion and a peripheral upwardly extending pleated wall. Alternatively, the filter may be a simple flat disc 3 as in FIG. 3. This disc may have a scalloped edge 21 as shown in FIG. 4 to encourage fitting into the device. To further encourage uniform folding of the periphery of a flat filter to fit into the device, the upper edge 13 of the frustum may be provided with uniformly spaced apart, upward projections 22, as shown in FIG. 3. When a flat filter is forced into the frustum, the projections 22 will cause the filter to form flutes uniformly around the periphery much like the pre-pleated filters. By using simple flat filters, manufacturing and storage costs of filters are reduced.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. Apparatus for use with a coffee maker and a filter for containing coffee grounds from which flavoring components are separated by a vertical hot liquid stream, and permitting the discharge of liquid with extracted components therefrom while blocking the passage of ground coffee along with the extracted components, the apparatus comprising:

A) a right cylinder having an upper edge and a lower edge and a thin wall, said lower edge being castellated with a plurality of slots extending upward from said lower edge to provide a resilient edge whose diameter may be elastically reduced by inward pressure thereon, said slots further providing for passage of liquid therethrough;

B) a frustum of a cone having an upper margin and a lower margin and a thin wall, said lower margin having a lesser diameter than said upper margin and being castellated with a plurality of slot means extending upward therefrom to provide a resilient edge whose diameter may be elastically altered by pressure thereon;

C) said castellated cylinder arranged within said castellated frustum to elastically retain a filter therebetween, said castellated edge elastically engaging an inner surface of a central portion of a filter and said castellated margin elastically engaging an outer surface of said central portion of said filter, whereby a space is provided between said cylinder and said frustum to securely retain a peripheral portion of said filter; and D) said cylinder holding said coffee grounds in a cylindrical configuration for more uniform and efficient extraction thereof.

2. The apparatus according to claim 1, in which said frustum is provided with a flange on the upper margin thereof for cooperation with a coffee maker.

3. The apparatus according to claim 1, in which said upper margin of said frustum is provided with a plurality of uniformly spaced apart upward projections to cooperate with a flat filter for enhanced peripheral folding when engaged between said cylinder and said frustum.

4. Apparatus for use with a coffee maker and a filter for containing coffee grounds from which flavoring components are separated by a vertical hot liquid stream, and permitting the discharge of liquid with extracted components therefrom while blocking the passage of ground coffee along with the extracted components, the apparatus comprising:

A) a substantially cylindrical inner member having an upper edge and a lower edge and a thin wall joining said edges, said lower edge being provided with a plurality of slots extending upward from said lower edge to provide a resilient slotted edge whose diameter may be elastically reduced by inward pressure thereon, said slots further providing for passage of liquid therethrough;

B) an outer member having an upper circular margin and a lower circular margin and a thin sloping wall joining said margins, said lower margin having a lesser diameter than said upper margin and being provided with a plurality of slot means extending upward therefrom to provide a resilient slotted margin whose diameter may be elastically altered by pressure thereon;

C) said inner member arranged within said outer member to elastically retain a filter therebetween, said slotted edge elastically engaging an inner surface of a central portion of a filter and said slotted margin elastically engaging an outer surface of said central portion of said filter, whereby an annular space is provided between said inner member wall and said outer member wall to securely retain a peripheral portion of said filter; and D) said inner member holding said coffee grounds in a cylindrical configuration for more uniform and efficient extraction thereof.

5. The apparatus according to claim 4, in which said outer member is provided with a flange on the upper margin thereof for cooperation with a coffee maker.

6. The apparatus according to claim 4, in which said upper margin of said outer member is provided with a plurality of uniformly spaced apart upward projections to cooperate with a flat filter for enhanced peripheral folding when engaged between said inner and outer members.

* * * * *